United States Patent [19]

Hannas

[11] 4,371,814
[45] Feb. 1, 1983

[54] INFRARED TRANSMITTER AND CONTROL CIRCUIT

[75] Inventor: James R. Hannas, Thiensville, Wis.

[73] Assignee: Silent Running Corporation, Clearwater, Fla.

[21] Appl. No.: 300,498

[22] Filed: Sep. 9, 1981

[51] Int. Cl.³ .............................................. H04R 7/02
[52] U.S. Cl. .................................... 318/16; 318/480; 318/345 H; 318/345 D
[58] Field of Search ..................... 318/16, 480, 345 H, 318/345 D; 340/825.69, 168 R, 168 B; 367/197-199

[56] References Cited

U.S. PATENT DOCUMENTS

| | | | |
|---|---|---|---|
| 2,791,768 | 5/1957 | Bucksbaum | 343/100 |
| 2,955,777 | 10/1960 | Null et al. | 244/14 |
| 3,162,794 | 12/1964 | Whitaker | 318/16 |
| 3,169,218 | 2/1965 | Reich | 318/480 X |
| 3,272,982 | 9/1966 | Stewart | 246/187 |
| 3,402,338 | 9/1968 | Thoresen | 318/345 D |
| 3,475,092 | 10/1969 | Harvey | 340/825.69 X |
| 3,832,691 | 8/1974 | Galler | 340/171 R |
| 4,038,590 | 7/1977 | Knowlton | 318/562 |
| 4,078,236 | 3/1978 | Hempell | 340/168 B X |
| 4,091,328 | 5/1978 | Hellman et al. | 325/37 |
| 4,207,466 | 6/1980 | Drage et al. | 250/338 |
| 4,221,966 | 9/1980 | Kerr et al. | 250/338 |
| 4,264,896 | 4/1981 | Sakarya et al. | 340/168 B X |
| 4,275,385 | 6/1981 | White | 340/312 |

Primary Examiner—Ulysses Weldon
Attorney, Agent, or Firm—Hill, Van Santen, Steadman, Chiara & Simpson

[57] ABSTRACT

An infrared transmitter and control circuit for a load such as a ceiling fan which is capable of starting and regulating the speed of the ceiling fan as well as reversing the direction of the ceiling fan, controlling a light. The apparatus allows the selective control of a single one of a plurality of ceiling fans such that operation of the control does not cause all of the ceiling fans to change speed. The apparatus eliminates the need for running wiring between the ceiling fan and a switch and saves substantial installation costs.

7 Claims, 3 Drawing Figures

INFRARED TRANSMITTER AND CONTROL CIRCUIT

BACKGROUND OF THE INVENTION

1. Field of the Invention

This invention relates in general to motor control circuits and in particular to a novel remote control infrared transmitter for a ceiling fan motor.

2. Description of the Prior Art

So as to save energy ceiling fans are used more and more so as to provide ventilation and circulation of air. The motors for driving the fans operate on the conventional AC power supply and are very noisy due to vibrations and surges occurring in the speed control circuits of the motor. Such noise is generated by conventional motor control circuits which switch the AC power source at points other than the zero crossing of the power supply thus resulting in expansion and shrinkage in the laminations of the motor resulting in loud hums which can be very annoying to the user.

The motor control circuits are generally switch controlled with a string or other type of switch connected to the fan motor. If wiring is run from the fan motor through the ceiling and wall to a wall switch this becomes very expensive for each installation.

SUMMARY OF THE INVENTION

The present invention relates to a novel infrared transmitter and receiver control circuit for a fan motor or other device which allows a directive transmitter to control a single receiver for varying the speed of the fan motor as well as to turn on a light or reverse the direction of rotation of the fan motor from a remote location.

The present invention eliminates motor noise by switching the power supply to the motor at times when the power supply is passing through a zero crossing thus eliminating the noise switches caused by transients during application of the power supply in prior art devices.

Since the circuit is very compact it can be mounted on the ceiling fan motor housing and the fan motor can be remotely controlled as desired. The infrared transmitter of the invention is directive so that a single receiver and fan can be controlled and other fans in the vicinity do not respond to the transmitter.

Other objects, features and advantages of the invention will be readily apparent from the following description of certain preferred embodiments thereof taken in conjunction with the accompanying drawings although variations and modifications may be effective without departing from the spirit and scope of the novel concepts of the disclosure in which:

DESCRIPTION OF THE PREFERRED EMBODIMENTS

Figure 2:
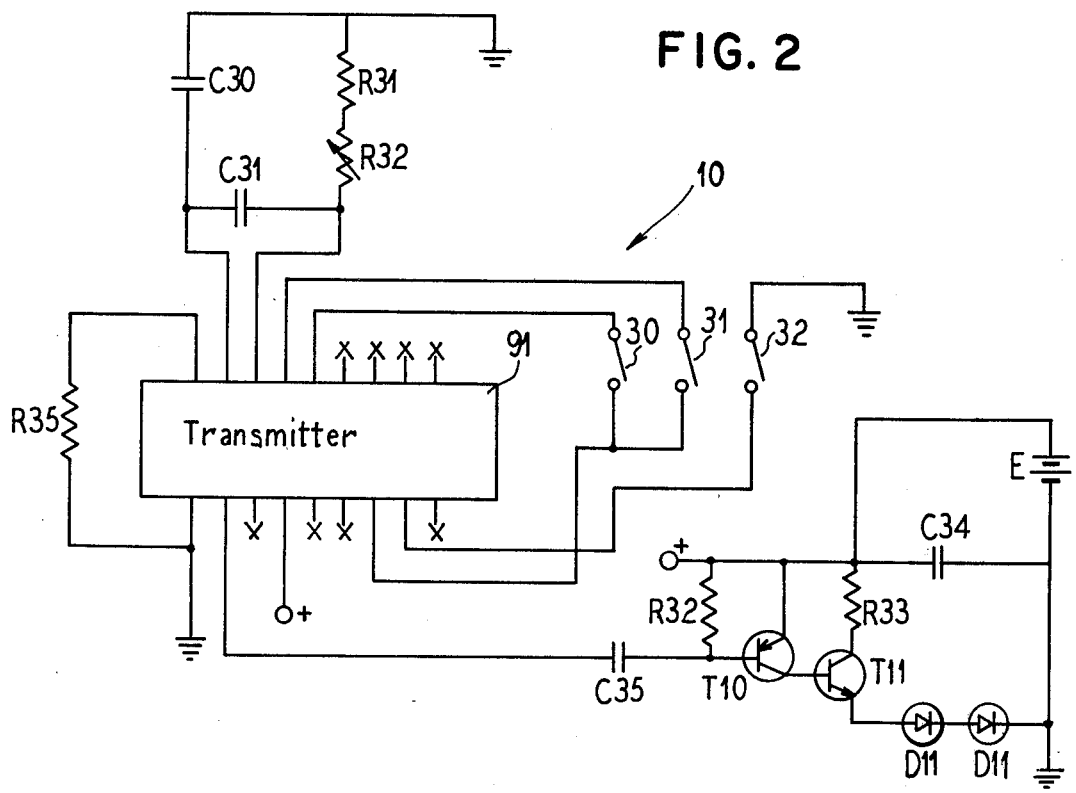
FIG. 2 illustrates the transmitter of the invention.

A remote control transmitter 10 which has an antenna 11 may be of type SL490 available from the Plessey Company and which comprises a 32 command pulse position modulation transmitter for transmitting infrared energy with the antenna 11 and which is shown in FIG. 2 is provided with switch button switches 30, 31 and 32 for controlling the on-off and speed of a fan motor 35 as well as for controlling the illumination of a light 36 and for controlling a reversing relay 37 for the motor 35. A remote control receiver of the type ML926 and infrared pulse pre-amplifier of type SL480 13 obtainable from the Plessey Company has an antenna 12 for receiving radiation from the transmitter 10 when the push button switches are depressed. A first output 14 of the receiver controls the off-on and speed of the motor 35 and supplies a clocking input to a counter 16 which may be a type CD4017BD binary counter with ten decoded outputs. One of the outputs from the counter 41 passes through diode D1 to the base of transistor T3. The emitter of transistor T3 is connected through a light emitting diode LED to a resistor R1 which might have a value of 390 ohms and which has its other side connected to ground. The collector of transistor T3 is connected to the gate of a Triac 42. A resistor R2 and a capacitor C1 are connected between one side of the Triac and the emitter. The resistor R2 may be 10k ohms and the capacitor C1 may be 0.02 microfarad. The other side of the Triac 42 is connected by lead 43 to a reversing switch 44 and to one terminal 45 of the motor 35. Another terminal 46 of the motor 35 is connected through the reversing switch 44 to one side of common power supply 17. A second output 47 is connected through a diode D2 to the base of transistor T4 which has its emitter connected to the light emitting diode LED and its collector is connected through resistor R3 and a capacitor C2 to a second Triac 48 which has its other side connected to a resistor R4 which might be one ohm which has its other side connected to the motor 35 through the reversing switch 44 through lead 49.

A third output of the counter 16 appears on lead 51 and passes through diode D3 to the base of transistor T5 which has its emitter connected to the emitters of the transistors T3 and T4 and the collector of transistor T5 is connected to the gate of a Triac 52. Another lead of Triac 52 is connected to a resistor R5. Resistor R5 is connected to parallel connected resistor R6 and capacitor C3. The resistor R5 may have a value of 1 ohm and the resistor R6 may have a value of 220K ohms. The capacitor C2 may have a value of 5 microfarads. A resistor R7 is in parallel with the capacitor C4 and have the same values as the resistors and capacitors R2 and C1 and this combination is connected between the collector of transistor T5 and the one lead of the Triac 52. A second side 18 of the power line is also connected to the one side of the Triacs 42, 48 and 52.

An output 61 from the counter 61 is connected to a transistor T6 which has its emitter connected to ground and its collector connected through a resistor R8 to lead 17 of the power supply. The resistor R8 may have a value of 120k for example. A capacitor C23 which may be of 0.001 microfarads is connected between the collector of transistor T6 and ground.

A lead 63 is connected from the collector of the transistor T6 to an input terminal of the counter 16.

A second output 71 of the receiver 13 is connected to flip-flop circuit 17 for the light control circuit 19 for the light 36. The flip-flop circuit 17 provides a Q output on lead 76 to the base of a transistor T2 which has its emitter connected to ground through a resistor R10 and its collector connected to the gate of a Triac 77 which has its other side connected to one side of the light 36 which has its other side connected to power lead 17. A resistor R11 and a capacitor C6 are connected between the emitter of transistor T2 and the other side of the Triac 77.

A third output 81 of the receiver 13 is connected to a circuit for controlling the reversing relay 37 which includes a flip-flop circuit 18 which has its Q output 82 connected to the base of a transistor T1 which has its emitter connected to ground through a resistor R12. The collector of transistor T1 is connected to a Triac 83 which has its other side connected to the reversing relay 37 which controls the reversing switch 44 to reverse the direction of the motor 35 and the other side of the relay is connected to the power lead 17 as illustrated. The collector of transistor T1 is connected through resistors R15 and capacitor C10 to the other side of the Triac 83. Lead 18 is connected to a resistor R20 which has its other side connected to ground and to a zener diode Z which has its other side connected to ground. A capacitor C21 is connected between ground and lead 18 and diodes D5 and D6 are connected across the capacitor C21. A resistor R25 is connected from the junction point between the diodes D5 and D6 to a capacitor C22. The capacitor C22 might be 1.5 microfarads the resistor R25 may be 47 ohms, the capacitor C21 may be 47 microfarads and the resistor R20 may be 10k ohms.

FIG. 2 illustrates a transmitter 10 of the invention which includes the switches 30, 31 and 32 which supply an input to the transmitter module 91. A resistor R35 which might be 2.2k is connected to module 91 and capacitor C35 which might be 0.0068 microfarads is connected to the module 91 and has its other side connected to the base of transistor T10 which has its collector connected to the base of a transistor T11. The emitter of transistor T11 is connected to ground through diodes D10 and D11. A power supply E is connected between ground and a resistor R33 which might be 0.47 ohms and which has its other side connected to the collector of transistor T11. A capacitor C34 is connected across the power supply E. A parallel network comprising the resistors R31 and R32 in series and capacitors C30 and C31 are connected to the module 91 as shown.

The module 91 may be of Plessey type SL490.

Figure 1:
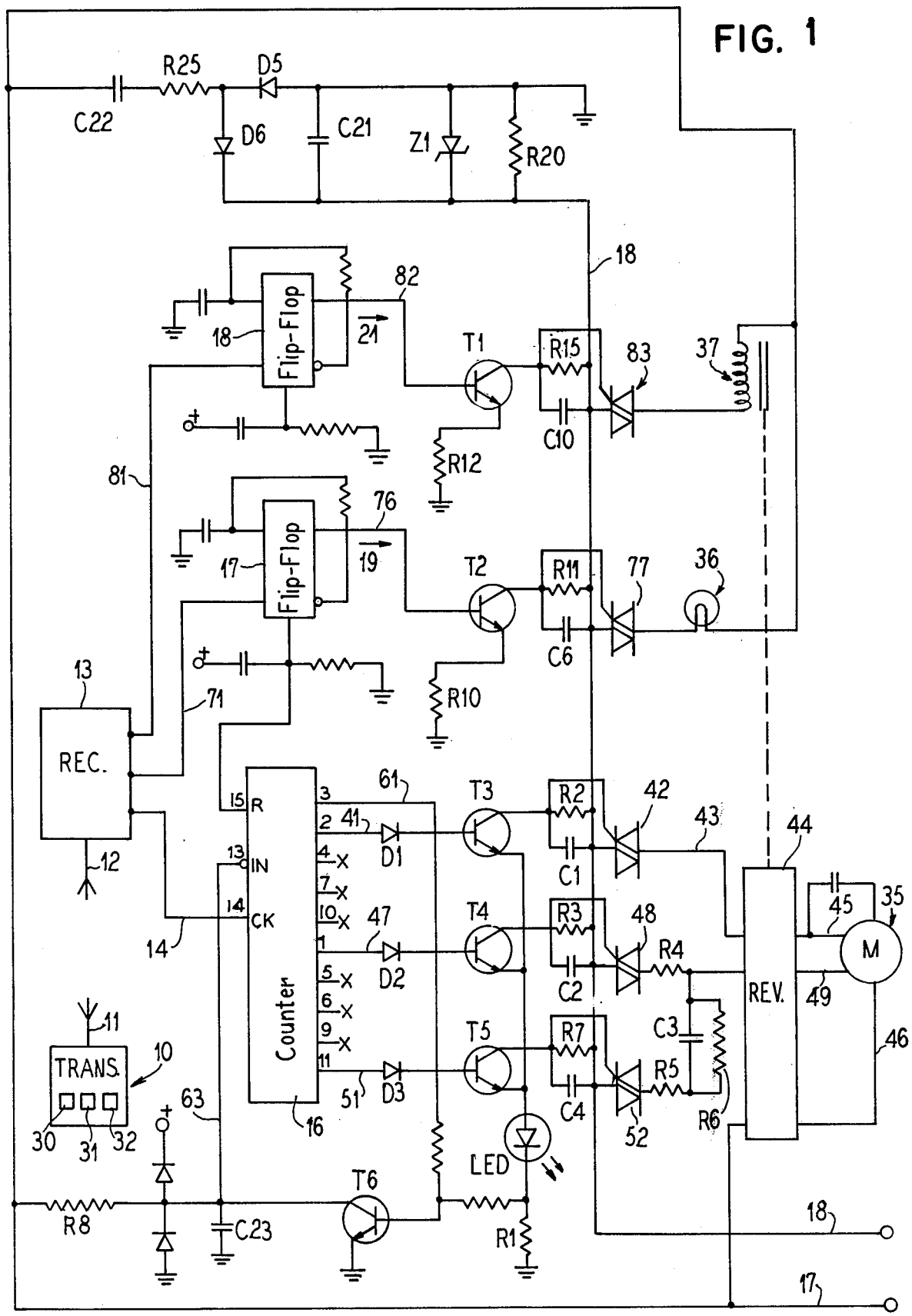
FIG. 1 is an electrical schematic of the invention.
Figure 3:
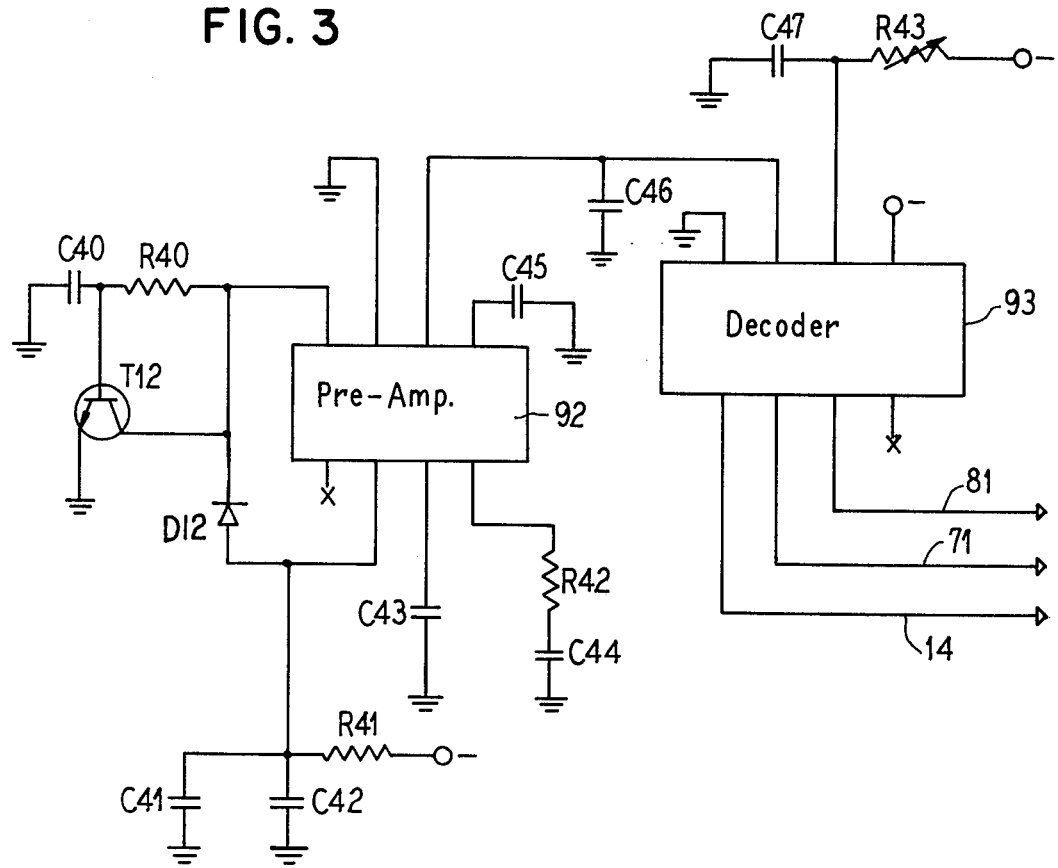
FIG. 3 illustrates the receiver of the invention.

FIG. 3 illustrates the receiver and receiver decoder comprising a receiver amplifier that might be a type SL480 designated by numeral 92 and a receiver decoder 93 which may be a type ML926 available from Plessey Company. The output leads of the receiver are connected to the receiver decoder 93 and the leads 14, 71 and 81 correspond to the leads illustrated in FIG. 1. A transistor T12 has its emitter connected to ground and its collector connected to a diode D30 to the receiver amplifier 92. The diode D30 is connected to ground through capacitors C41 and C42 which might have values of 0.02 microfarads and 100 microfarads respectively. A capacitor C40 is connected between ground and the base of transistor T12 and resistor R40 is connected between the base of transistor T12 and receiver amplifier 92. A resistor R43 and a capacitor C47 are connected to the receiver decoder 93 as illustrated.

In operation, the fan 35 can be turned on by depressing the switch 30 and as the switch 30 is depressed the receiver 13 will produce an output on lead 14 to the counter 16 energizing the motor 35. By sequentially depressing the switch 30 the speed of the motor can be adjusted or the motor can be turned off as desired. The motor can be set to approximately full, three quarter, one half and one quarter speeds by depressing the switch 30 and the novel circuitry of the invention provides that the motor will operate noise free and with minimum hum.

The light 36 can also be turned on and off by actuating switch 31 which will cause the receiver to produce an output on lead 71 to energize the light control circuit 19.

If the direction of rotation of the motor 35 is to be changed, the switch 32 may be energized so that the receiver 13 will produce an output on lead 81 to energize the reversing relay 37 to cause the switch 44 to apply power to the motor 35 in the reverse direction thus causing the motor to reverse.

Whenever OFF or one of the three speeds is not selected by the operator, the signal applied to the second count input of counter 16 advances whenever the A.C. signal goes below 10 volts and the counter only counts once every time the A.C. waveform passes through zero. By placing three unused counts between each speed will cause the A.C. wave form to take three cycles and go through zero until it gets to one of the outputs as selected to drive one of the transistors T3, T4 and T5 and the TRIAC's 42, 48 and 52. As the A.C. wave form passes through zero the counter 16 counts up until it gets to the selected input. Once it has turned on one of the TRIAC's it then turns on a transistor T6 which shorts the count input to ground and prevents the counter from counting any more and stops at the selected speed. Essentially the input of the counter is clocked by the switch then it goes to an unused count which then allows the A.C. input to count up until it finds an input which is a valid state either OFF or one of the three speeds and makes the changes on the zero crossing at the power supply.

Although the invention has been described as applicable to the control of fan motors, it can also be used to control heater elements such as water heaters, ceiling heating elements, ventilation mechanisms or any other type of apparatus which it is desired to remotely control.

It is seen that this invention provides a new and novel remote control circuit for a ceiling fan motor and although it has been described with respect to preferred embodiments, it is not to be so limited as changes and modifications may be made therein which are within the full intended scope as defined by the appended claims.

I claim as my invention:

1. An infrared control system for a ceiling fan motor or other load comprising, an infrared transmitter with keying switches for transmitting directional infrared energy, an infrared receiver and decoder for receiving and decoding the output of said transmitter, a counter connected to receive an output of said receiver and decoder, a first transistor connected between a first output of said counter and a second input of said counter, a second transistor connected to a second output of said counter, a first TRIAC with its gate connected to an output of said second transistor and supplying an output to a first input lead of said fan motor, a third transistor connected to a third output of said counter, and a second TRIAC with its gate connected to an output of said third transistor and supplying an output to a second input lead of said fan motor.

2. An infrared control system according to claim 1 including, a fourth transistor connected to a fourth output of said counter, and a third TRIAC with gate connected to an output of said fourth transistor, a first resistor and a first capacitor connected between said third TRIAC and said second input lead of said fan motor.

3. An infrared control system according to claim 2 including first and second power supply leads with said first power supply lead connected to a third input lead of said fan motor and said second power lead connected to said first, second and third TRIACS.

4. An infrared control system according to claim 3 comprising first, second and third resistor-capacitor circuits respectively connected between the gates of said first, second and third TRIACs and said second power lead.

5. An infrared control system according to claim 4 comprising a first flip-flop circuit which receives an output from said receiver-decoder, a fifth transistor connected to the output of said first flip-flop circuit, a fourth TRIAC with its gate connected to said fifth transistor, a light with one side connected to said fourth TRIAC and its other side connected to said first power lead.

6. An infrared control system according to claim 5 including a reversing switch connected between said first, second and third TRIAC and said first, second and third input leads of said fan motor and comprising, a second flip-flop circuit connected to an output of said receiver-decoder, a sixth transistor connected to the output of said second flip-flop circuit, a fifth TRIAC with its gate connected to said sixth transistor, a reversing relay connected between said fifth TRIAC and said first power lead and said reversing relay connected to said reversing switch to cause the fan motor to reverse direction of rotation.

7. An infrared control system according to claim 6 comprising a light emitting diode connected between the emitters of said second, third and fourth transistors and ground.

* * * * *